United States Patent Office 3,402,752
Patented Sept. 24, 1968

3,402,752
REINFORCING CORD AND TIRE THEREFROM
Charles W. Beringer, Hopewell, Va., assignor to Allied Chemical Corporation, New York, N.Y., a corporation of New York
No Drawing. Continuation of application Ser. No. 473,215, July 19, 1965. This application Oct. 9, 1967, Ser. No. 674,014
4 Claims. (Cl. 152—359)

ABSTRACT OF THE DISCLOSURE

A tensilized cord for reinforcing belts and especially tires, the cords being composed of continuous filaments of nylon 6 or nylon 66 in which is dispersed microfibers of polyethylene terephthalate at 50:50–75:25 weight proportion, the microfibers averaging 0.02–0.2 micron in diameter and averaging in length 250–15,000 times their average diameter. These cords as the result of tensilization have elongation at break of 12.4%–19% and have good to excellent ratings in all of the critical properties by which tire cords are rated, including flat spot index superior to that of similar cords from the nylon ingredient alone.

---

This application is a continuation of applicant's copending application Ser. No. 473,215 filed July 19, 1965, now abandoned.

The invention relates to cords for reinforcing hydrocarbon elastomeric articles such as pneumatic tires and to process for treating cords produced from a dispersion of polyester in polyamide, to render them suitable for einforcing articles from elastomeric substances primarily of hydrocarbon constitution such as natural rubber and synthetic rubbers including elastomeric polymers e.g. from butadiene; isoprene; isobutylene; ethylene-propylene; styrene-butadiene; styrene-butadiene-vinyl pyridine isobutylene-isoprene; etc.

Cords made by twisting together continuous filament yarns of rayon or nylon or polyesters are employed in the reinforcement of pneumatic rubber tires for use in airplanes, automobiles, and tractors or other construction equipment. The use of reinforcing cords has resulted in valuable improvements in the wear characteristics and shock resistance of tires. The cords, however, do not, without treatment, adhere well to the elastomer from which the tire is formed and/or have a tendency toward acquiring more or less permanent undesirable elongation during processing or use, with the result that the tire performance is sometimes unsatisfactory. In the present highly competitive state of the tire-making art, these problems must be solved, and solved by easily applied and economical methods, if the cord offered is to be acceptable to the trade.

A number of adhesive compositions have been devised for use on tire cords. The most successful of these are rubber base adhesives composed of resins together with natural or synthetic rubber latices. By far the most widely used of such adhesives is the system commonly referred to as "RFL" adhesive. It comprises a combination of resorcinol and formaldehyde in a molar ratio of approximately 1:2 together with a rubber latex formed from any one or a combination of elastomers such as those above specified. A typical RFL adhesive for use on rayon or nylon cords has composition as follows:

| | Parts by weight |
|---|---|
| Rubber-latex [1] | 244 |
| Resorcinol | 11 |
| Formaldehyde | 16.2 |
| Water | 298.5 |
| Sodium hydroxide | .3 |

[1] Butadiene-styrene-vinyl pyridine terpolymer.

With rayon cords the process of treatment to fit the cords for use in tires, etc. is a simple one of dipping the cord in the adhesive and then passing the wet cord through an oven in which the time-temperature relationship is sufficient to dry the cord. In a typical process the dipped rayon cord is dried by passage through an oven maintained at between 250° F. and 300° F. at exposure times of from one to six minutes. The cord is kept under sufficient tension to hold it at fixed length for processing and equalize the tensions on the filaments in the final cord structure.

The term "stretch" as used herein refers to the percent increase in length of the cord as it passes through a particular zone. This stretch is imposed by applying tension sufficient to elongate the cord as it passes through the zone, for example by operating a take up roll at higher peripheral speed than that of the feed roll. Rayon cord can be given a moderate stretch up to about 6% during drying. The term "relaxation" has the opposite connotation: the tension applied allows a controlled decrease in the length of the cord as it passes through a zone wherein the cord shows a tendency to contract as in a drying or heating zone.

With nylon cords the process is somewhat more complex since it is necessary to stretch the cord at high temperatures to reduce the tendency toward "growth," i.e. tendency of the nylon, during processing and/or service to acquire elongation which is at least semi-permanent, whereby tire performance is depreciated. Nylon is processed in either a two stage or a three stage operation. In the two stage process the cord, after being dipped in the rubber adhesive, is first dried in a temperature range of from about 250° F. to 350° F. under a stretch of about 1%; then the cord is hot-stretched at from about 390° F. to 475° F. by about 10% to about 14%.

In the three stage process for nylon tire cord, the above two stages are followed by a third stage of relaxation at elevated temperature, i.e. an annealing stage. In this stage the tendency toward growth of the nylon is further improved by permitting a relaxation of up to 4% at elevated temperature.

For proper adhesion of polyester cords such as polyethylene terephthalate to rubber, two adhesives are required. The polyester cord is first contacted with an adhesive system comprising a poly functional isocyanate; a trimerization product of an isocyanate; an epoxy resin; or a polyvinyl chloride polyamide polyamine combination. The cord is then passed through a heated zone generally at around 420° F. where the adhesive reacts with the polyester; then is dipped in a rubber adhesive such as RFL, and dried under tension at least sufficient to prevent contraction. An annealing step may be used to reduce the tendency toward growth, but is not generally necessary.

Whichever processing method is employed, the tire cord is ultimately imbedded in the elastomer and the composite mass is cured.

In copending U.S. patent application of I. C. Twilley, Ser. No. 368,028, filed May 18, 1964 for "Polyester Dispersions" there is described a novel class of high strength yarns in which polyester microfibers are dispersed in a drawn polyamide filament. The polyester microfibers have average diameter not above 0.5 micron and average length at least 20 times their average diameter; and lie predominantly in the direction of the filament axis. Preferably in the practice of this invention the dispersed polyester microfibers have an average diameter of 0.3 micron or less and still more preferably between 0.02 and 0.2 micron and generally decreasing with the proportion of polyester; and have average length of about 250 to 15,000 times their average diameter.

The filaments from which the novel yarns of Twilley are derived are formed from polyamide such as for example nylon 66 (i.e. polyhexamethylene adipamide) and/or nylon 6 (i.e. poly-ε-caproamide) having dispersed therein filament-forming polyester having a glass transition temperature when in the amorphous form of at least 50° C. and higher than that of the nylon ingredient, and having higher tensile modulus than does the nylon ingredient. The proportion of nylon in the dispersion or polyblend is from about 50 to about 90 parts by weight and the proportion of polyester is correspondingly from about 50 to about 10 parts by weight per 100 parts of the blend. Primary amino groups in the nylon are usually blocked or terminated, e.g., by acyl groups of a mono- or dicarboxylic acid whereby usually not more than 40% of the nylon end groups are species which are reactive with the polyester. Preferably the primary amino groups in these terminated polymers analyze not over about 10 milliequivalents per kilogram of polyamide.

The polyamides used in the above dispersions are exemplified particularly by nylon 66 prepared by condensation of hexamethylene diamine and adipic acid and by nylon 6 prepared by polymerization of caprolactam. They are long chain polymeric amides capable of being formed into a filament, having recurring amide groups as an integral part of the main polymer chain. The polyesters used are exemplified particularly by polyethylene terephthalate, and are long chain polymeric esters, capable of being formed into a filament which may be but is not necessarily capable of molecular orientation along the filament axis, as indicated by X-ray examination. These polyesters have recurring ester groups and recurring cyclic structure as integral parts of the main polymer chain.

Either or both the polyamide ingredient and polyester ingredient can be homopolymers or block or random copolymers, or a mixture of two or more such polymers. The polyamide will usually have both crystalline and amorphous regions; and the polyester can include a crystalline region or can be entirely amorphous. Groups other than amide and ester, respectively, may be present in minor amounts in these polymers, such groups including: carbonate, urea, urethane, ether, ketone, imidazole, oxazole, and other oxygen-containing moieties. Moreover, other ingredients, polymeric or not, can be present in these dispersions in minor proportions and the nylon and/or polyester ingredients can be mixtures of nylons and/or polyesters, respectively.

The preferred ingredients from which the yarns used in this invention are formed are polyalkylene terephthalate, especially polyethylene terephthalate as the polyester and either nylon 6 or nylon 66 or a mixture as polyamide ingredient. These polymers are readily available and the results obtained using them are especially good.

The present invention is concerned with a process for treating filamentary structures, especially cords prepared from the aforesaid dispersions, to fit the cords for use as reinforcement of hydrocarbon elastomers e.g. in tires. Surprisingly, a modification which represents a simplification of the usual nylon processing conditions has been found to be effective to confer upon cord from yarns of the Twilley polyblend dispersion a good-to-excellent rating in all of the critical properties set out below, by which tire cords are rated. As above discussed, in treating commercial nylon cords, after applying adhesive a hot stretch of at least 10% is imposed, usually 12%–14%. In the process of this invention adhesive is applied as for nylon cord, then hot stretch broadly in the range 3%–10% is imposed, especially 5%–8% as the optimum. Higher stretch deteriorates the properties, e.g. it results in higher shrinkage and lower strength and durability.

This invention can be applied in a two-stage process in which the cord is contacted with the rubber base adhesive, suitably by dipping; and then is dried at a temperature up to about 450° F. For speed and best cord properties, a drying temperature of 300° to 350° F. should be used. During this drying operation the cord will tend to shrink. A better equalization of tension among the filaments of the final cord structure is generally obtained, however, by slight stretching up to about 3% and best about 1% to 2%. Too high a stretch at this stage results in less favorable final properties, especially in higher shrinkage and higher retractive force (at 190° C.).

The optimum residence time in the drying zone will depend upon the structure of the cord. Generally speaking residence times of from about 20 to 360 seconds are applicable. For cords twisted from 2 yarns to form 1680 denier, the preferred residence time is 60 to 80 seconds. For other constructions presently used commercially the preferred residence times are as follows:

| | Seconds |
|---|---|
| 3 yarns 840 denier each | 100–150 |
| 2 yarns 1260 denier each | 100–150 |
| 2 yarns 1680 denier each | 150–210 |
| 3 yarns 1260 denier each | 150–210 |

The cord is then hot stretched, the necessary temperature for optimum cord properties being about 390° F. to about 475° F. and the coordinate treating time being from about 20 to about 60 seconds. Higher temperatures in this range will be used with shorter treating times and with cords from nylon ingredients of relatively high melting points, e.g. nylon 66 vs. nylon 6. To impart optimum properties and to stabilize the cord against undesirable elongation during production and/or use of tires incorporating the cords, a stretch of from about 3% to about 10%, and best from 5% to 8% should be imposed. Again the preferred treating time will vary with structure of the cords as follows:

| | Seconds |
|---|---|
| 2 yarns 840 denier each | 20–30 |
| 3 yarns 840 denier each | 30–40 |
| 2 yarns 1210 denier each | 30–40 |
| 2 yarns 1680 denier each | 50–60 |
| 3 yarns 1260 denier each | 50–60 |

This invention can also be applied using a third stage of treatment consisting of a relaxing and annealing step. In this step the tension on the cord is reduced to allow relaxation and annealing at constant length or with reduction in length, up to about 6%. Best results in terms of stability of the cord structure are usually obtained by annealing with reduction of length in the range of 0.0%–3%. In the annealing zone the temperature is maintained at from about 325° F. to about 475° F. during a treating time of from about 20 to about 60 seconds. The preferred treating time will again vary with the size of the cord as follows:

| | Seconds |
|---|---|
| 2 yarns 840 denier each | 20–30 |
| 3 yarns 840 denier each | 30–40 |
| 2 yarns 1260 denier each | 30–40 |
| 2 yarns 1680 denier each | 50–60 |
| 3 yarns 1260 denier each | 50–60 |

The optimum conditions will vary somewhat as the denier changes; and conditions will usually require interadjustment to obtain best results. If a temperature at the low end of the above defined ranges is used in the drying zone, for example, the residence time should be sufficiently long so that the moisture content of the yarn is not higher than 2% by weight and preferably not above 1% by weight as the yarn leaves the drying zone. For yarns employed to reinforce tires, the processing conditions set forth above are completely satisfactory.

The following table compares results of standard tests for critical properties of cords from 840 denier tire yarn from polyester dispersions in poly-ε-caproamide, twisted into 2-ply cord, and treated using the preferred conditions of this invention above set forth; as against a standard commercial nylon 6 tire cord of the same construction, treated under optimum conditions in a three stage processing unit. The tire yarn forming the cords reported in the first two columns was prepared from a 30:70 dispersion by weight of polyethylene terephthalate in poly-ε-caproamide by the process outlined above and fully disclosed in the above cited Twilley application, in particular in Example 1 thereof. The cords were composed of two such yarns of 840 denier, 136 filament count, plied together in a 12Z x 12S twist construction.

TABLE 1.—TYPICAL VALUES

|  | Nylon-polyester blends | | Control, nylon 6 3-stage |
|---|---|---|---|
|  | 2-stage | 3-stage |  |
| Tenacity, g./d. | 7–8 | 7–8 | 7.8 |
| E-10 [1] percent | 6–7 | 6–7 | 8.1 |
| E-B [2] percent | 17–19 | 17–19 | 20.0 |
| Initial tensile modulus, g./d. (20° C.) | 35–45 | 35–45 | 30 |
| Shrinkage,[3] percent | 15–18 | 13–16 | 15 |
| R.F.[4] grams | 700–800 | 600–700 | 800 |
| F.S.I.[5] | 25–31 | 25–30 | 39 |

[1] Elongation with 10 pound load. Low elongation corresponds to desirable high tensile modulus.
[2] Elongation at break.
[3] At 190° C.
[4] Retractive force developed at 190° C. by a yarn sample held in an oven at fixed length, being the length of the yarn at room temperature and 40 grams total tension (ie. under no stretch).
[5] Flat spot index, tested as outlined below.

The test used for flat spotting propensity of a given cord, which is known to correlate well with actual performance of cords in tires reinforced therewith, was as follows.

Conditioning the specimens:

(1) Suspend two 20-inch specimens of 840 denier cord in an oven (a glass tube jacketed for heating by steam) containing dry nitrogen.

(2) Apply a 0.5 g./d. load to each specimen and heat oven to 105° C.; hold temperature and load for one hour.

(3) Cool oven to room temperature and increase load to 0.75 g./d.; hold for 30 minutes.

(4) Heat oven to 105° C.; hold for one hour.

(5) Cool oven to room temperature; and hold for 30 minutes.

(6) Reduce load to 0.50 g./d. Heat oven to 105° C.; hold for 16 hours.

(7) Cool oven to room temperature and hold for 30 minutes.

The conditioned specimens are tested as follows:

(8) Heat oven to 105° C.; hold for 20 minutes.

(9) Reduce load on one specimen (cord B) to 0.25 g./d., hold for 5 minutes, then cool oven to room temperature (approximately 20 minutes).

(10) Increase load on cord B to 0.5 g./d. Observe length of specimens after 30 seconds.

The flat-spot index is taken as the difference in length between the two specimens after reapplication of load in step 10, expressed in millimeters and multiplied by ten.

It is to be noted that the products treated by either the 2-stage or the 3-stage process of this invention have levels for all of the tested properties at least comparable to nylon. The principal improvements are the higher tensile modulus and lower flat spot index. These properties are related, and affect wearing qualities and riding qualities of the tire. The three-stage process of this invention moreover produces a product with markedly reduced retractive force, not over about 0.45 gram per denier at high temperature, compared with products produced in the two-stage process or with nylon in three stages. The lower retractive force significantly reduces occurrence of distortion during production of tires.

Similar results are obtained with cords of varying denier.

The adhesion of the cords of this invention to elastomers, and their durability, are found to be essentially the same as for nylon-6 cords.

Because of the importance of the flat spotting property in tires, and importance of the durability, experimental 7.50 x 14, 2-ply tires were built using as the reinforcing cords, the cords of this invention. The Cure Ejection Temperature was 345° F., maximum cure temperature was 350° F., and Post Inflation Pressure was 35 p.s.i. The tires were rated for flatspotting in comparison with tires similarly produced using commercial nylon-6 tire cord, as follows:

A tire, mounted on the front wheel of an automobile is driven under normal front axle load by a rotating drum until it reaches a normal operating temperature. The tire is then allowed to cool down to ambient temperature and within 1 p.s.i. of its inflation pressure before the test. The resulting flatspot is then run out by rotating the drum at a speed equivalent to 22 m.p.h. The axle deflection (bounce) during runout is measured continuously in multiples of gravitational acceleration, "g," by an accelerometer and recorded.

For 2-ply tires from the cords of the invention, this flat-spot rating was 1.0 vs. 1.4 for the comparison tire made with commercial nylon-6 cords. For 4-ply tires the flat-spot rating was 1.35 vs. 1.7 for the comparison of nylon 4-ply tires.

When higher than normal curing temperatures were used, viz. 365° F. Cure Ejection Temperature and 370° F. maximum cure temperature, the resulting tire reinforced with cords of the invention retained about the same flat-spot rating of 1.

Seven tires (7.35 x 14) of standard construction, reinforced in the standard manner with cords of the invention, were tested for durability. The standard Government Services Administration test, Bulletin ZZ–T–0038LJ of July 13, 1959 was used at a speed of 60 miles per hour. The tires were loaded with a force of 1020 pounds at 24 p.s.i. air pressure and were run at 60 miles per hour for 7 hours. This was considered a 100% load. These same tires were run for the next 16 hours at 120% load and thereafter at 140% load until tire failure. The tires of the invention ran on the average well over 100 hours, viz. 107 hours, before failure; which compares to a normal performance of nylon tires of about 75–85.

A highly significant advantage of the invention described and claimed herein is that tire manufacturers who are equipped to process nylon tire cord can process the new and improved polyester-polyamide dispersion yarns in already existing equipment by the herein claimed process, obtaining excellent properties. It would certainly not have been predictable that improved products could be obtained under processing conditions which would be less demanding than required for nylon cords and would not require the two dips normally employed with polyester cords.

The best mode contemplated by me of carrying out my invention is illustrated by the specific embodiment thereof which follows, but the invention is not to be understood as limited to all details of this specific embodiment.

Example 1

An 840 denier tire yarn was employed, obtained from filaments in which polyethylene terephthalate microfibers were dispersed in poly-ε-caproamide continuous filaments at 30:70 weight proportions, and averaging on the order of 0.1 micron in diameter, or on the order of 25,000 microfibers traversing the cross-section of each filament (per electron microscope). Such yarns can be prepared as disclosed in Example 1 of the above-cited Twilley application. The yarn was twisted into a 2-ply cord using a 12Z x 12S twist construction. This cord was then treated on a single end Litzler dipping and tensilizing apparatus using a three-stage process. The cord was first passed through an RFL adhesive bath of the composition above set out, then was passed to an air blow-off device to remove excess adhesive. The cord then travelled into a drying oven where the cord was dried at a temperature of 325° F. at an exposure time of 80 seconds. A tension of 0.25 gram per denier which imposed a stretch of 1% was maintained on the cord during drying. The cord was then passed into a hot stretching zone at a temperature of 410° F. for a period of 20 seconds under a tension of 0.875 gram per denier which imposed a stretch of 6%. After hot stretching, the cord was passed through an annealing zone at 400° F. for an exposure time of 30 seconds. The tension on the cord in this zone was 0.625 gram per denier which was sufficient to maintain the cord at constant length (0.0% relaxation).

In a specific embodiment of the two-stage process of this invention the same operations were carried out omitting the annealing step.

In both instances the physical properties of the products obtained are as shown in the above Table 1 and are such that the cords are useful in the production of tires.

Example 2

An 840 dienier, 136 filament tire yarn was prepared by melt blending of 30% by weight polyethylene terephthalate with 70% by weight polyhexamethylene adipamide (nylon 6,6). The polyester employed had an orthochlorphenol reduced viscosity at 25° C. and concentration of 0.5% of 0.8 deciliter per gram. The nylon 6,6 employed had an orthochlorphenol reduced viscosity of 1.055 deciliters per gram measured by the same method. The polymers were blended at an extruder shear of greater than 110 reciprocal seconds utilizing a 1 inch diameter extruder screw operating at a pressure of between 2,800 and 3,500 p.s.i.g. and at 65 r.p.m. The thread height in the metering section was .03 inch.

The molten polymer was passed through a conventional melt spin pack and into a spinnerette with 20 holes of 14 mil diameter each developing a shear per hole of 5,500 reciprocal seconds. The residence time of the molten blend within the extruder and the spin pack and until passage through the spinnerette was 7 minutes. The extruded filaments pass downward through a quenching atmosphere; thence over a finish application roll; thence the yarn was taken up at a speed of 750 feet per minute and at a tension of less than .03 gram per undrawn denier. The yarn was then drawn in a conventional manner passing over a draw pin, a draw heater and thence onto a pirn at a take-up tension .25 gram per drawn denier and at .3 turn per inch. The drawn denier was 128 and there were 20 filaments present. A control yarn of 30 parts polyethylene terephthalate in the form of microfibers dispersed in 70 parts polycaproamide was prepared by the identical procedure as above outlined.

The polyhexamethylene adipamide-polyester blend yarn had the following properties: tenacity (UTS), 8.5 gms./den.; ultimate elongation, 11.0%; initial tensile modulus, 82 gms./den. and flat-spot index, 21.

Seven ends of this yarn were combined to produce a yarn having a nominal total denier of 840 and 140 filaments. This 840 denier yarn was converted into tire cord by individually twisting 2 ends in a Z direction and combining the two ends by twisting in a S direction for 12 turns per inch to form 2-ply (840/2) greige cord of 12Z and 12S turns per inch construction. The greige cord was tensilized by the following procedure: a single end of the 2-ply (840/2) greige cord was passed through a resorcinol-formaldehyde-latex bath in a manner described in Example 1. The dip pickup was about 6% by weight of dip to the polyblend cord.

The greige cord was then passed through a single end Litzler drying and tensilization apparatus using a 3-stage process. The drying and tensilization conditions employed were:

| Tensilization conditions selected | Drying | Stretch | Annealing |
|---|---|---|---|
| Temperature, °F | 325 | 375 | 70 |
| Tension (lbs.) | 1.5 | 4.0 | 4.0 |
| Exposure time (seconds) | 80 | 20 | 20 |
| Percent stretch | 1.0 | 6.0 | 0 |

TABLE II.—3-STAGE TENSILIZED CORD PROPERTIES
840/2—12Z x 12S TWIST

| Property | Tensilized cord | | |
|---|---|---|---|
| | Control nylon 6 | 30% polyester, 70% nylon 6,6 | 30% polyester, 70% nylon 6 |
| Total denier | 1,849 | 1,899 | 1,827 |
| Percent resorcinol formaldehyde latex dip | 5.8 | 6 | 5.6 |
| Ultimate tensile strength, gms./den. | 7.7 | 6.6 | 7.9 |
| Ultimate elongation, percent | 18 | 13.1 | 14 |
| Toughness index (UTS) (UE)½ | 32.7 | 23.9 | 29.5 |
| Initial tensile modulus, gms./den. | 22 | 33 | 33 |
| Percent strength retained, 24 hours in air at 165° C.[1] | 89 | 94 | 98 |
| Percent strength retained after steam at 140° C.[2] | 52 | 100 | 94 |
| Percent strength retained after steam at 150° C.[2] | 40 | 97 | 69 |
| Percent thermal shrinkage at 191° C., relaxed [2] | 16 | 12 | 18 |
| Retractive force at constant length and 191° C., gms./den. | .44 | .42 | .37 |
| Flat spot index | 39 | 28 | 27 |
| ¼″ H adhesion at 250° F., pounds [3] | 13 | 11 | 12 |
| Goodyear tube fatigue, time to failure, mins.[4] | 4,475 | 2,408 | 1,142 |
| Goodrich disk fatigue test, 24 hours, percent strength retained [5] | 94 | 92 | 91 |

[1] Samples wound on aluminum bobbins at .5 gms./den. tension.
[2] Exposed 10 minutes at the indicated temperature, essentially relaxed.
[3] Described in copending U.S. patent application I. C. Twilley, Serial #368,028, filed 5/18/64 "Polyester Dispersions."
[4] ASTM Standard 1964, Part 25 (D885) pages 205–208, Modified to 30 p.s.i. pressure in tube.
[5] ASTM Standard 1964, Part 25 (D885) pages 213–215.

In Table II the tensilized cord properties of 30% polyethylene terephthalate dispersed in 70% polyhexamethylene adipamide and alternately in 70% polycaproamide are compared with each other and with a 100% nylon control, the tensilization procedure being identical for the 3 cords except that the 100% nylon 6 control was processed under its optimum conditions of 10% stretch in the stretch zone.

As can be observed from Table II the polycaproamide blend tensilized cord has greater UTS, 7.9 gms./den.; toughness index, 29.1; thermal shrinkage, 18%; and ultimate elongation, 14.0% than does the polyhexamethylene adipamide blend cord whose properties were UTS, 6.6 gms./den.; toughness index, 23.9; thermal shrinkage, 12% and ultimate elongation of 13.1%.

The initial tensile modulus, the 24 hour heat stability, the retractive forces and the flat-spot index being essentially equivalent for both polyamides as blends.

The polyhexamethylene adipamide-polyester blend showed superior resistance to loss in strength at 150° C. steam, temperature and somewhat higher resistance to fatigue in the Goodyear tube test when compared to the polycaproamide-polyester blend.

Both blends as tensilized cords were superior to the control nylon in initial tensile modulus, in reduced flat-spot index and in resistance to steam at 150° C.

The control nylon was superior to the blend cords in resistance to fatigue in the Goodyear tube test.

From Table III, when the percentage of polyester is increased from 30% to 40% and to 50%, there is an increase in the diameter of the polyester fibrils, and a decrease in the number of polyester fibrils per unit filamentary cross section, and a decrease in the diameter to length ratio. A 50% nylon, 50% polyester blend is present as a mixture of a network structure and discrete polyester fibrils.

Typically the nylon-polyester blend tensilized cords of this invention have the following properties which vary with the composition.

described for the 4-ply tire above. Two and four-ply tires made of blends of 30% polyethylene terephthalate and

TABLE III.—TENSILIZED CORD TYPICAL PROPERTIES

| | | | | |
|---|---|---|---|---|
| Parts polyester | 10 | 30 | 40 | 50 |
| Parts nylon | 90 | 70 | 60 | 50 |
| Polyester fibril diameter | .03 | [3] .11 | [3] .12 | [2] .15 |
| Polyester fibrils/1,000 µ [2] | [1] 125,400 | [3] 33,000 | [3] 31,600 | [2] 13,600 |
| Polyester fibril, length/dia | 13,800 | 2,230 | 2,040 | [2] 1,340 |
| Flat spot index | | 28 | 26 | 24 |
| Ultimate tensile strength, gms./den | | 7.9 | 7.3 | 6.9 |
| Ultimate elongation, percent | | 14 | 12.9 | 12.4 |
| Toughness index (UTS) (UE)½ | | 29.6 | 26.4 | 24.2 |
| Initial tensile modulus, gms./den | | 33 | 42 | 50 |

[1] Filament Cross Section.
[2] A mixture of a network structure and discrete particles. Values are approximate based on electron microscopic measurement.
[3] Measured with an electron microscope.

In Table III for the tensilized cords of this invention as the concentration of polyester is increased in the blends from 30% to 50%, there is a decrease in the flat-spot index from 28 to 24, and an increase in the initial tensile modulus from 33 to 50 gms./den.

There is a corresponding reduction in ultimate tensile strength from 7.9 to 6.9 gms./den.; a reduction in ultimate elongation from 14 to 12.4% and a corresponding reduction in toughness index as the concentration of polyester in nylon polyester blends is increased from 30 to 50%.

The 2-ply (840/2) tensilized cord of Table II 12Z x 12S turns per inch construction was used in the construction of 4-ply experimental tires. Single ends were laid up on a .016 inch greige, 100% natural rubber gum at 24 ends per inch and calendered using conventional methods. The calendered fabric was cut to proper dimensions to produce a 750–14, 4-ply bias tire and fabricated into experimental tires using standard production beads, chafers, and inner liners. The treads were extruded and experimental tires were cured in a McNeil Bag-O-Matic Press with manual loading using 190 p.s.i. (384° F.) internal steam and (332° F.) external surface steam for a period of 16 minutes. All tires were then subsequently post-cure inflated with 50 p.s.i. air pressure on manual post-inflation units for 1 cycle.

To produce 2-ply tires, in a similar manner, 1260 denier, 210 filament yarn was prepared by plying of multiple ends. Two identical ends of 1260 denier were twisted 10 turns in a Z direction and then the two ends were combined by twisting in a S direction to produce a 2-ply (1260/2) tire cord of 10S x 10Z turns per inch greige cord construction. The 2-ply (1260/2) cords were tensilized in a similar manner to that described above and were laid up at 26 ends per inch on a .016 inch gage rubber stock of a 100% natural rubber gum. The production of the 2-ply tire was in a manner similar to that 70% polyhexamethylene adipamide and alternately 70% polycaproamide were compared with tires made in a similar manner of the control polycaproamide yarn above referred to.

In Table IV, flat-spot severity is measured as the peak-to-peak acceleration (bounce of the automobile front axle) determined 0.5 minute after starting the runout portion of the test using an accelerometer in the method as previously described. The tire noise level is the peak-to-peak acceleration (bounce) of the tire caused by normal manufacturing irregularities which is determined at the end of the tire runout cycle as determined with an accelerometer and is expressed in (G's) units times gravity. The flat-spot runout is the distance in miles until the tire reaches an imperceptible bounce level as determined by the evaluation of a panel jury. The non-objectionable runout miles equals the miles for the flat spot to be reduced to a non-objectionable level by subjective evaluation of a panel jury.

TABLE IV

| Type tire | 750–14 4-ply tire | | | 750–14 2-ply tire | | |
|---|---|---|---|---|---|---|
| Type reinforcement | Control nylon [7] | 70% nylon 6 [1] | 70% nylon 6,6 [2] | Control nylon [7] | 70% nylon 6 [1] | 70% nylon 6,6 [2] |
| Flat spot severity [3] | 1.67 | 1.36 | 1.34 | 1.29 | 1.03 | 1.02 |
| Hours to failure [5] | | | | 51 | 80 | 75 |
| Tire noise [3] | .35 | .26 | .30 | .26 | .28 | .29 |
| Runout miles to nonobjectionable level [4] | 1.0 | 0.7 | 0.7 | 0.5 | .3 | .35 |
| Runout miles to nonperceptible level [4] | 5.0 | 3.4 | 3.45 | 2.2 | 1.7 | 1.8 |
| Flat spot mils deflection [6] | | | | 270 | 195 | 200 |

[1] Tire cord, 30% polyethylene terephthalate, 70% polycaproamide.
[2] Tire cord, 30% polyethylene terephthalate, 70% polyhexamethylene adipamide.
[3] Peak-to-peak bounce accelerometer x gravity.
[4] Panel jury test, minimum 6 trials by 6 separate experts average of their results. Tires were mounted on 1964 Ford station wagon front tires inflated cold to 25 p.s.i. air pressure; rear tires 30 p.s.i. The tires were run at 60 miles per hour for 50 miles and then allowed to set 17.5 hours. The runout miles were determined at 30 miles per hour.
[5] The 750–14 tires were inflated to 24 p.s.i.g., then run at 60 miles per hour at 100% overload for 7 hours; then 120% overload for 16 hours, then 140% overload for 24 hours; (cumulative total hours, 47). The tire was then inflated to 45 p.s.i. and ran at 45 miles per hour at 180% overload until failure. Similar to Standard Government Service Administration test Bulletin ZZ-T-0038LJ of July 13, 1959 except for the 180% overload.
[6] Mils deflection out of round in the footprint area of the tire—a measure of flat spot index. Mils deflection measured as described under 4 above after standing 17.5 hours.
[7] Polycaproamide.

From Table IV it can be observed that 2-ply tires flat spot to a lesser degree than the 4-ply tires. It can also be observed that the nylon polyester blends of this invention when converted to 2 and 4-ply tires are essentially equivalent to each in terms of flat spot severity, and the time for the flat spot to run out in dynamic tests and are very superior to the control nylon in these properties.

The noise level for 2-ply tires is slightly reduced over a 4-ply tire. The polyhexamethylene adipamide blend tires as compared with the polycaproamide blend tires were essentially equivalent in properties.

In dynamic tests at various overload factors in hours to failure (Table IV) the nylon/polyester blends of this invention were superior to the control nylon. This is interpreted to mean that the nylon blend tires were at least equal to the control nylon tires durability.

Similar results are obtained with other yarns prepared from the above described 30:70 polyethylene terephthalate:nylon 6 dispersions and nylon 6,6 dispersions in a wide variety of deniers including all of the sizes presently used commercially, utilizing the processing conditions described and claimed herein. Broadly similar results will be expected using dispersions of other polyesters and/or other nylons.

When weight proportions in a dispersion of specifically polyethylene terephthalate in nylon 6 are much above about 75:25 of nylon-polyester, the flatspotting property of the resulting cord will be less favorable than for these and lower proportions of the nylon. The proportions of the nylon can be down to 60:40 ratio and somewhat lower, but at about 50:50 weight proportions and lower proportions of nylon:polyester, the polyethylene terephthalate may constitute an appreciable proportion of the surface of the filaments whereby the adhesion, to hydrocarbon elastomers, of cords obtained by following the above procedure may be lower than desired with a resorcinol formaldehyde latex adhesive. Better results with these dispersions high in polyester content can be obtained by employing adhesive containing polyfunctional isocyanates and known equivalents, thereof.

The tensilized cords of this invention have been found superior to nylon for the production of conventional bias-ply tires, radial ply-circumferential belt tires and especially for the production of bias-radial ply combination tires.

The nylon polyester blends tensilized cords prepared in accordance with this invention have been found especially suitable in the production of reinforced elastomeric structures such as conveyor belts, fan belts and the like.

I claim:

1. A tensilized cord composed of continuous filaments of nylon selected from the group consisting of a polycaproamide and polyhexamethylene adipamide having dispersed therein microfibers of polyethylene terephthalate at about 50:50 to 75:25 weight proportions of nylon:polyester and averaging between about .02 micron and 0.2 micron for the diameter of the microfibers, and generally decreasing with the proportion of polyester, said microfibers averaging in length 250 to 15,000 times their average diameter; said tensilized cord having tenacity in gms./den. of at least 6.5, elongation at the break of 12.4 to 19%, initial tensile modulus of 30 to 50 gms./den. at 20° C., thermal shrinkage of 12 to 18% at 190° C., retractive force not over about .45 gms./den. at 190° C. and flat spot index of about 25 to 31 on a scale where commercial nylon 6 cord is 39.

2. A tensilized cord composed of continuous filaments of nylon selected from the group consisting of polycaproamide and polyhexamethylene adipamide having dispersed therein microfibers of polyethylene terephalate at about 50:50 to 75:25 weight proportions of nylon:polyester and averaging between about .02 micron to 0.2 micron for the diameter of the microfibers, and generally decreasing with the proportion of polyester, said microfibers averaging in length 250 to 15,000 times their average diameter; said tensilized cord having tenacity in gms./den. of at least 6.5, elongation at the break of 13 to 19%, initial tensile modulus of 30 to 45 gms./den. at 20° C., thermal shrinkage of 12 to 18% at 190° C., retractive force not over about .45 gms./den. at 190° C. and flat spot index of about 25 to 31 on a scale where commercial nylon 6 cord is 39.

3. An elastomeric article of hydrocarbon elastomer reinforced with the cords of claim 2.

4. A tire reinforced by the cords of claim 2, having an average initial flat spotting by observing axle bounce with an accelerometer of about 1.0 $g$ for a 2-ply tire and about 1.35 for a 4-ply tire and a durability measured by standard tests at 60 m.p.h. at least equal to a like tire made using nylon cords of the same construction.

References Cited

UNITED STATES PATENTS 2,695,425   11/1954   Stott _____ 260—857 XR

FOREIGN PATENTS 610,140   10/1948   Great Britain.

ARTHUR L. LA POINT, *Primary Examiner.*

S. T. KRAWCZEWICZ, *Assistant Examiner.*